United States Patent [19]

Shigematsu et al.

[11] Patent Number: 4,817,469

[45] Date of Patent: Apr. 4, 1989

[54] AUTOMATIC TRANSMISSION FOR AUTOMOBILE AND METHOD OF CONTROLLING SAME

[75] Inventors: Takashi Shigematsu; Tomoyuki Watanabe; Setsuo Tokoro, all of Susono; Daisaku Sawada, Gotenba, all of Japan

[73] Assignee: Toyota Jidosha Kabushiki Kaisha, Toyota, Japan

[21] Appl. No.: 125,814

[22] Filed: Nov. 23, 1987

Related U.S. Application Data

[63] Continuation of Ser. No. 568,791, Jan. 6, 1984, abandoned.

[30] Foreign Application Priority Data

Aug. 22, 1983 [JP] Japan ................. 58-151732

[51] Int. Cl.⁴ .............................................. B60K 41/12
[52] U.S. Cl. ........................................ 74/866; 74/867
[58] Field of Search ............... 74/866, 867, 865, 862, 74/863, 864, 844; 123/488, 480, 492, 361; 474/8, 12, 18

[56] References Cited

U.S. PATENT DOCUMENTS

| | | | |
|---|---|---|---|
| 4,181,944 | 1/1980 | Yamauchi et al. | 123/480 |
| 4,205,377 | 5/1980 | Oyama et al. | 123/480 |
| 4,387,608 | 6/1983 | Mohl et al. | 474/12 |
| 4,393,467 | 7/1983 | Miki et al. | 364/424.1 |
| 4,423,485 | 12/1983 | Sami et al. | 123/480 |
| 4,458,318 | 7/1984 | Smit et al. | 474/12 |
| 4,458,561 | 7/1984 | Frank . | |
| 4,459,878 | 7/1984 | Frank . | |
| 4,462,277 | 7/1984 | Miki et al. . | |
| 4,466,521 | 8/1984 | Hattori et al. | 74/866 |
| 4,470,117 | 9/1984 | Miki et al. | 474/12 |
| 4,479,186 | 10/1984 | Takao et al. | 123/480 |
| 4,490,790 | 12/1984 | Shinoda | 74/866 |
| 4,495,921 | 1/1985 | Sawamoto | 123/480 |
| 4,507,986 | 4/1985 | Okamura et al. | 74/860 |
| 4,509,125 | 4/1985 | Fattic et al. . | |
| 4,515,040 | 5/1985 | Takeuchi et al. . | |
| 4,546,673 | 10/1985 | Shigematsu et al. | 74/856 |
| 4,566,354 | 1/1986 | Kumura et al. | 74/865 X |

FOREIGN PATENT DOCUMENTS 58-88252 5/1983 Japan .

Primary Examiner—Leslie A. Braun
Assistant Examiner—Dwight G. Diehl
Attorney, Agent, or Firm—Oblon, Fisher, Spivak, McClelland & Maier

[57] ABSTRACT

A continuously variable transmission (CVT) for a motor vehicle. A desired speed ratio of the CVT is defined as a substantially continuous function of a throttle position and a vehicle speed. The desired speed ratio is calculated in accordance with a detected throttle position and a detected vehicle speed. The CVT is controlled in such a way that an actual speed ratio equals the calculated desired speed ratio.

17 Claims, 9 Drawing Sheets

| Throttle Position θ [%] \ Nout [r.p.m] | 0 | 250 | 500 | 750 | 1000 | 1500 | 2000 | 2500 | 3000 | 3500 | 4000 | 4500 | 5000 | 5500 |
|---|---|---|---|---|---|---|---|---|---|---|---|---|---|---|
| 100 |   |   |   |   | ↓ | 0.5 | 0.75 | 1.0 | 1.25 | 1.5 | 1.65 | 1.75 | ↓ | ↓ |
| 80  |   |   |   |   | ↓ | 0.5 | 0.6 | 0.75 | 1.0 | 1.25 | 1.5 | 1.75 | 2.0 |   |
| 60  |   |   |   | ↓ | 0.5 | 0.6 | 0.75 | 1.0 | 1.25 | 1.5 | 1.75 | 2.0 | ↓ |   |
| 40  |   |   | ↓ | 0.5 | 0.6 | 0.75 | 1.0 | 1.25 | 1.5 | 1.75 | 2.0 | ↓ |   |   |
| 30  |   |   | ↓ | 0.5 | 0.75 | 1.0 | 1.25 | 1.5 | 1.7 | 1.85 | 2.0 |   |   |   |
| 20  |   | ↓ | 0.5 | 0.75 | 1.0 | 1.25 | 1.5 | 1.75 | 2.0 | ↓ |   |   |   |   |
| 10  |   | ↓ | 0.5 | 0.75 | 1.0 | 1.5 | 2.0 |   |   |   |   |   |   |   |
| 0   | 0.5 |   |   |   |   |   |   |   |   |   |   |   |   |   |

BASIC SPEED RATIO eb

ROTATIONAL SPEED OF OUTPUT SHAFT Nout [r.p.m]

AUTOMATIC TRANSMISSION FOR AUTOMOBILE AND METHOD OF CONTROLLING SAME

This application is a continuation of application Ser. No. 568,791 filed on Jan. 6, 1984, now abandoned.

BACKGROUND OF THE INVENTION

1. Field of the Invention

This invention relates to an automatic transmission for automobiles utilizing a continuously variable transmission (hereinafter called a CVT) and a method of controlling the same.

2. Description of the Prior Art

The speed ratio in conventional automatic transmissions for automobiles is changed stepwise from the first to fourth steps, for example, and the change of step is determined by the rotational speed of the output shaft of the transmission, i.e. by the vehicle speed and the throttle (valve) position of an intake system to provide a predetermined hysterisis between shift-up and shift-down. Also, when the first speed is changed to the second one at a predetermined rotational speed of an output shaft within the low range, the first speed is thereafter maintained irrespective of the rotational speed of the output shaft. By such control of the change of step, sufficient driveability is assured over a wide running range of the engine. However the fact that the speed ratio in the respective speed change step region is fixed, the provision of the hysteresis, etc. are all disadvantageous to fuel consumption, and the low efficiency of power transmission of a hydraulic torque converter used together with a stepped automatic transmission results in a reduction in fuel consumption. Further, the occurrence of impulses in the speed change also provides a drawback.

While in general methods of controlling a CVT, the speed ratio e of the CVT is controlled so that (1) the actual engine speed Ne provides the desired engine speed Ne', (2) the amount of change ΔNe per a predetermined time of the engine speed Ne in the speed change, i.e. the change of the speed ratio e is controlled to be a desired value or (3) the speed ratio e provides a desired speed ratio e', the rate of speed change, i.e. the differential value de/dt of the speed change with respect to time is not limited in any of these controlling methods. Since the transmission loss of the CVT in the speed change of the CVT is increased, the specific fuel consumption in the speed change is degraded by such controlling methods.

SUMMARY OF THE INVENTION

An object of the present invention is to provide an automatic transmission for automobiles which can provide the optimum variable speed ratio for the vehicle running conditions and avoid the occurrence of shock caused by speed change, as distinguished from conventional stepped automatic transmissions for automobiles.

A further object of the present invention is to provide a method and apparatus for controlling a CVT which can ensure driveability while improving the specific fuel consumption.

In the automatic transmission for automobiles according to the present invention, to achieve these objects a CVT for transmitting the rotation of an engine to the drive wheels is provided with means to calculate the desired speed ratio as an approximately continuous function of the intake system throttle position and vehicle system throttle position and the vehicle speed and to control the speed ratio of CVT on the basis of these calculated values.

Thus, the speed ratio is controlled precisely and continuously by the CVT to be suited to the running condition of vehicle so that the fuel consumption and running performance can be remarkably improved and the occurrence of shock in speed change can be avoided, in comparison with power transmitting units of stepped transmissions. Also, when the desired speed change is corrected by a change in engine temperature or the like, speed change patterns fixed in conventional stepped automatic transmissions irrespective of the engine temperature can be alternated by the control of the speed change corresponding to the engine temperature so that a large advantage is provided in the performance of running engine and the purification of exhaust gas.

Also, according to the present invention, the rate of speed change de/dt of the CVT is made a function of the amount of pedalling Ac of an accelerator pedal and the amount of change ΔAc in this pedalling amount Ac or as a function of the differential value dAc/dt of the pedalling amount Ac with respect to time and the vehicle speed V of the rotational speed Nout of output shaft of CVT.

Thus, the rate of speed change de/dt is set according to the running condition of an engine, i.e. to the minimum value for ensuring necessarily sufficient running performance. As a result, the increase of the rate of speed change de/dt causing the increase of transmission loss can be restrained to be as little as possible to ensure the running performance while improving the specific fuel consumption. In addition, if a driver expects superior driveability for a CVT car, the de/dt can be set in proportion to the difference between the desired speed ratio e' and the actual speed ratio e.

Intake pipe pressure P, throttle position θ, or intake air flow Q in corresponding relation to the pedalling amount Ac can be obtained as data substituted for the pedalling amount Ac, and P, θ and Q and their change amounts ΔP, Δθ, ΔQ, or their differential values dP/dt, dθ/dt, dQ/dt with respect to time can be used instead of the pedalling amount Ac, its change amount ΔAc or the differential value dAc/dt with respect to time.

Also, assuming that the change amount in the speed ratio e of the CVT per unit time is Δe, this Δe can be reflected as the rate of speed change in the speed change operating amount of the CVT. The operating amount for changing the speed ratio (e) of the continuously variable transmission up to a desired value may be a function of Δe.

BRIEF DESCRIPTION OF THE DRAWINGS

Other objects and advantages of the present invention will become apparent from the following description taken in conjunction with the accompanying drawings, in which:

FIG. 5 is a chart illustrating the relationship between the output speed of the CVT and the throttle position;

DETAILED DESCRIPTION OF A PREFERRED EMBODIMENT OF THE INVENTION

Figure 1:
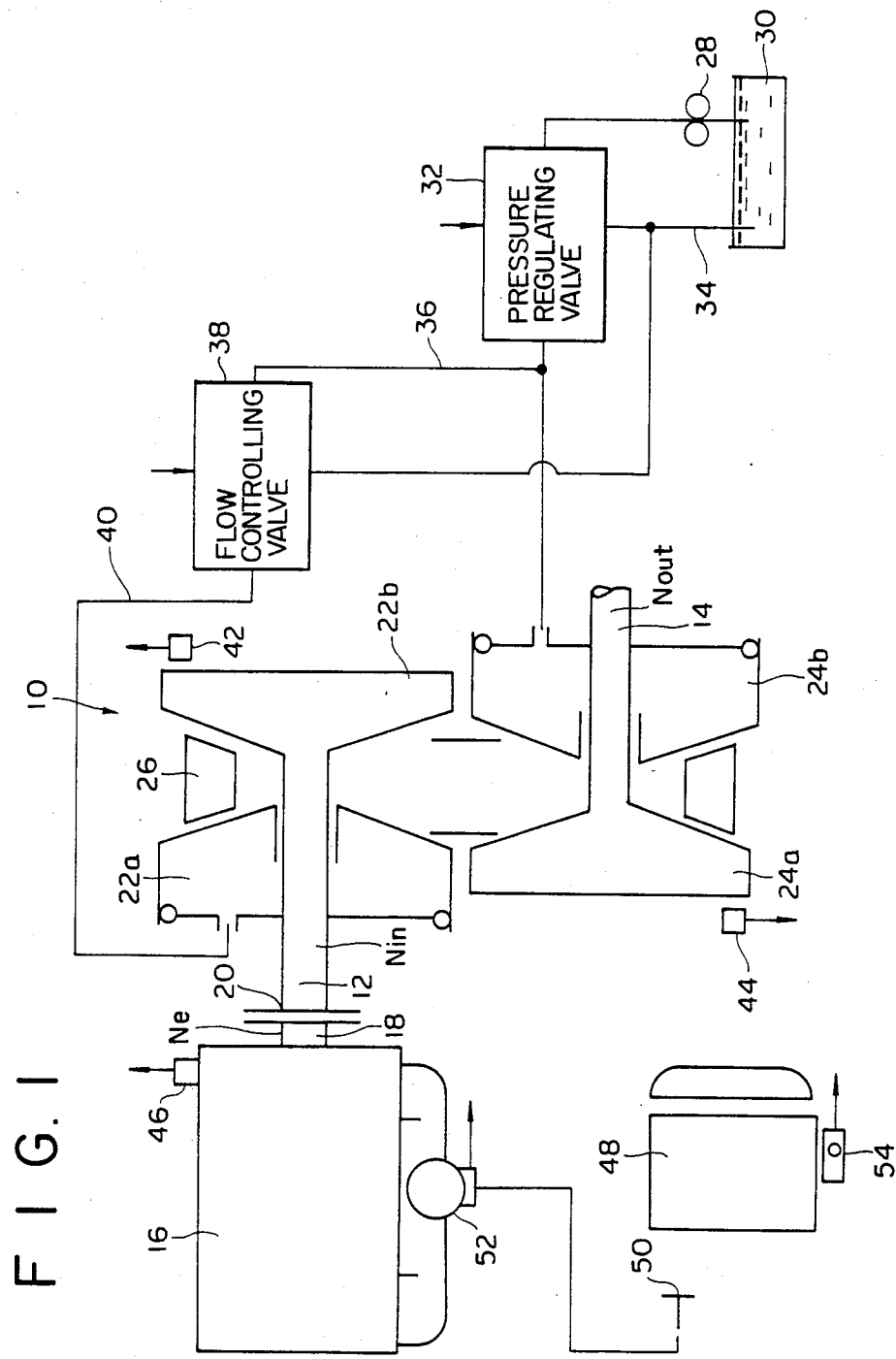
FIG. 1 shows an embodiment according to the present invention.
Figure 10:
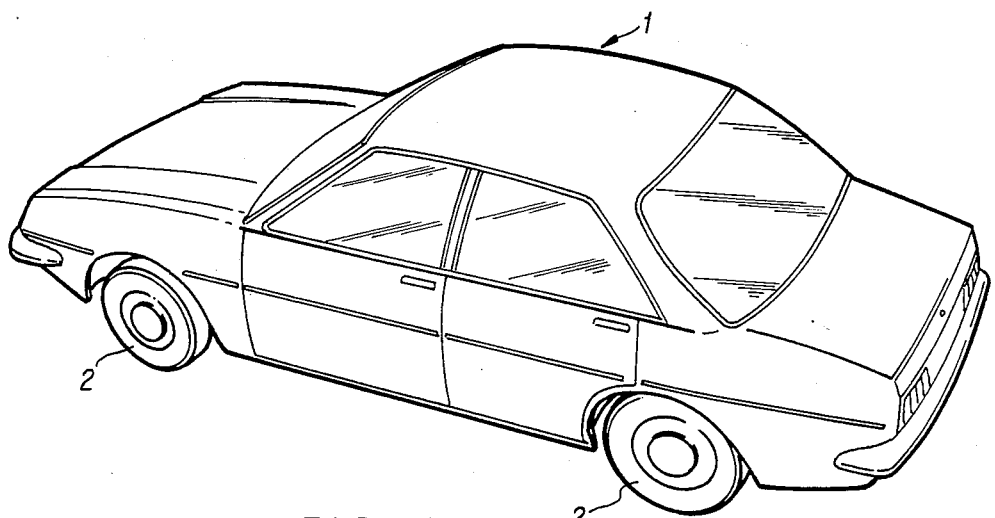
FIG. 10 is a prospective view of a vehicle of a type in which a transmission according to the invention may be used.

In FIG. 1, CVT 10 of a vehicle 1 (FIG. 10) is provided with an input shaft 12 and an output shaft 14 parallel to each other. The output shaft 14 delivers power to selected ones of the wheels 2 of the vehicle 1. The input shaft 12 is provided coaxially with a crankshaft 18 of an engine 16 and connected to the crankshaft 18 through a clutch 20. Input side pulleys 22a, 22b are provided opposed to each other, one input side pulley 22a being provided axially movably as a movable pulley and circumferentially fixedly on the input shaft 12, and the other input side pulley 22b being secured fixedly to the input shaft 12 as a fixed pulley. Similarly, output side pulleys 24a, 24b are provided opposedly to each other, one output side pulley 24a being secured fixedly to the output shaft 14 as a fixed pulley and the other one 24b being axially movable as a movable pulley and circumferentially fixed on the output shaft 14. Opposed surfaces of the input side pulleys 22a, 22b and the output side pulleys 24a, 24b are formed to be tapered and a belt 26 having an isosceles trapezoidal section is trained over the input side pulleys 22a, 22b and the output side pulleys 24a, 24b. An oil pump 28 sends oil from an oil reservoir 30 to a pressure regulating valve 32. The pressure regulating valve 32 varies the amount of oil escaping to a drain 34 to control line pressure in an oil path 36 which is sent to a hydraulic cylinder and a flow controlling valve 38 of the output side pulley 24b. The flow controlling valve 38 controls the oil flow supplied from the oil path 36 to an oil path 40 connected to the hydraulic cylinder of the input side pulley 22a and the oil flow drained from the oil path 40 to the drain 34. The pressing force of the input side pulleys 22a, 22b and the output side pulleys 24a, 24b to the belt 26 is controlled by oil pressure in the input and output side hydraulic cylinders so that the belt 26 engaging the radii on the tapered surfaces of the input side pulleys 22a, 22b and the output side pulleys 24a, 24b are varied in relation to this pressing force and thereby the speed ratio e of CVT 10(=Nout/Nin, provided Nout is the rotational speed of the output shaft, Nin is the rotational speed of the input shaft 12, and in this embodiment, Nin is equal to engine speed Ne) is varied. The line pressure in the output side hydraulic cylinder is controlled to the necessary minimum value for avoiding slipping of the belt 26 and ensuring the power transmission to restrain the drive loss of the oil pump 28, and the speed ratio e is controlled by the oil pressure in the input side hydraulic cylinder. Further while the oil pressure in the input side hydraulic cylinder is lower than or equal to that in the output side hydraulic cylinder, since the pressure receiving surface of the input side hydraulic cylinder is larger than that of the output side hydraulic cylinder, the pressing force of the input side pulleys 22a, 22b can be larger than that of the output side pulleys 24a, 24b. An input side rotational angle sensor 42 and an output side rotational angle sensor 44 detect respectively the rotational speeds Nin, Nout of the input shaft 12 and the output shaft 14, and a water temperature sensor 46 detects cooling water temperature in the engine 16. An accelerator pedal 50 is provided in a cab 48 and a throttle valve in an intake path is interlocked with the accelerator pedal 50 so that a throttle position sensor 52 detects throttle position $\theta$. A shift position sensor 54 detects the shift range of a shift lever provided near the cab.

Figure 2:
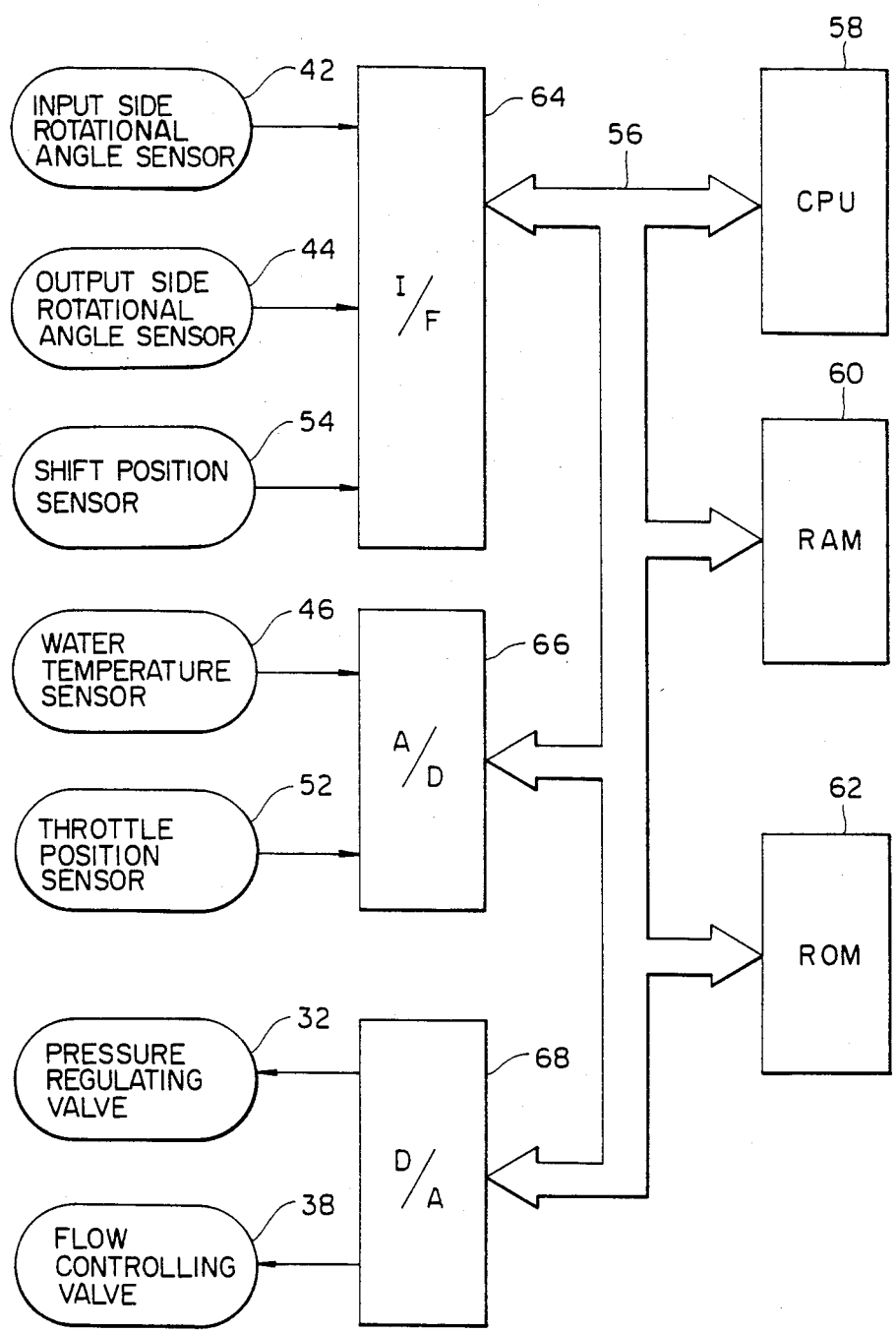
FIG. 2 shows, in a block diagram format, an electronic control unit used with the CVT.

FIG. 2 is a block diagram of an electronic control unit. An address data bus 56 interconnects a CPU 58, RAM 60, ROM 62, I/F (interface) 64, A/D (Analog/Digital converter) 66 and D/A (Digital/Analog converter) 68. The I/F 64 receives pulse signals from the input side rotational angle sensor 42, the output side rotational angle sensor 44 and the shift position sensor 54, the A/D 66 receives analog signals from the water temperature sensor 46 and the throttle position sensor 52, and the D/A 68 sends output pulses to the pressure regulating valve 32 and the flow controlling valve 38.

Figure 3:
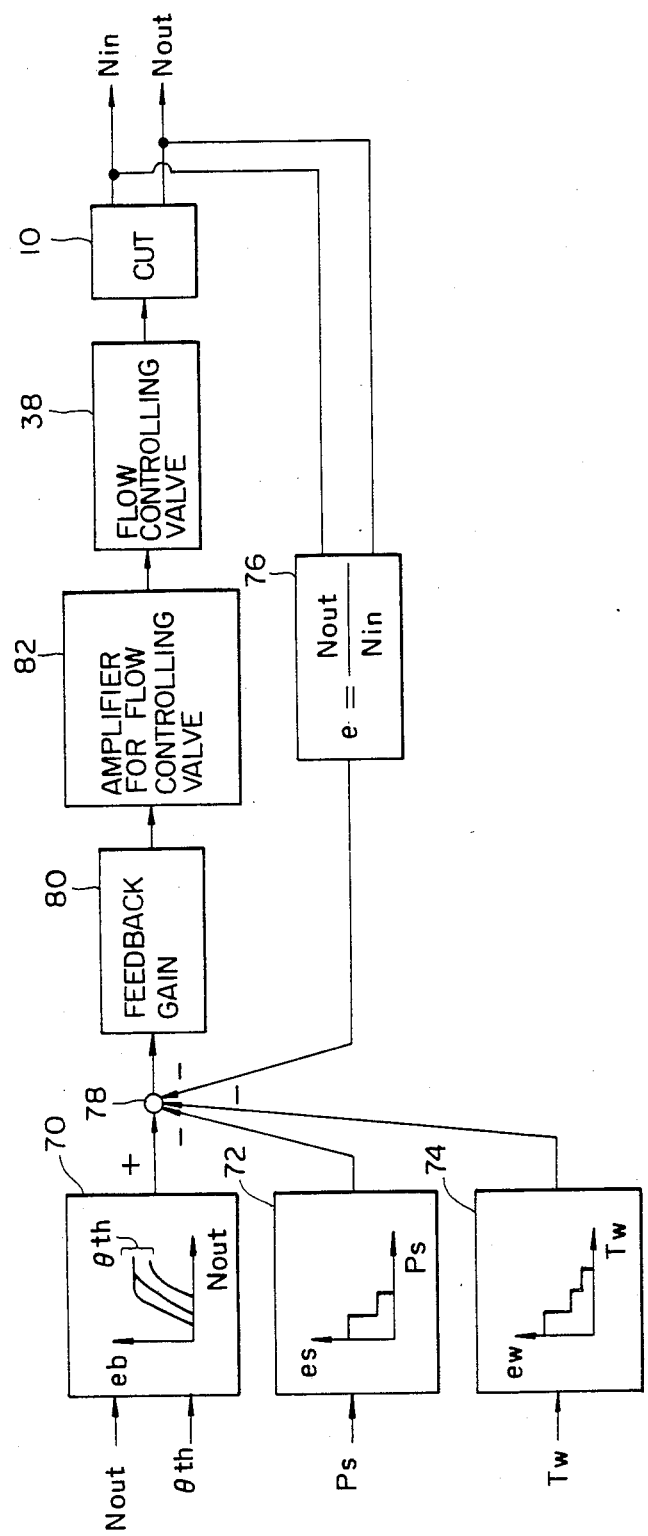
FIG. 3 is a block diagram illustrating certain features of the preferred embodiment of the present invention.

FIG. 3 is a block diagram of an embodiment according to the present invention. In block 70 is calculated a basic speed ratio eb from the rotational speed Nout (=vehicle speed) of the output side disk 7a, and throttle position $\theta$th. FIG. 5 shows data on a map storing the basic speed ratio eb. In FIG. 5, →, ← mean that they equal respectively right and left data. Further the speed ratio $$e = \frac{\text{rotational speed } N\text{out of output shaft 14}}{\text{rotational speed } N\text{in of input shaft 12}}.$$

Figure 6:
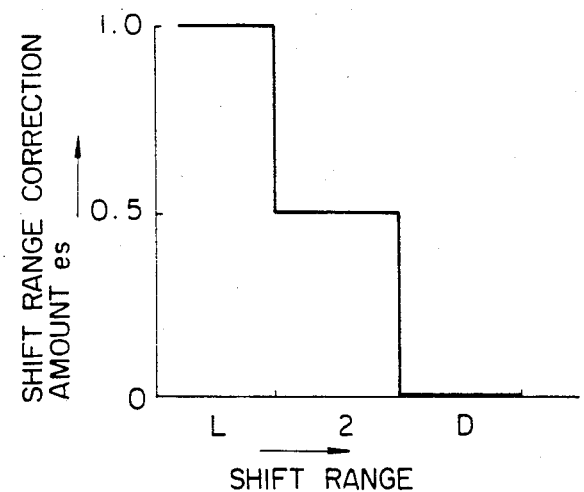
FIG. 6 is a graph showing the relationship between a shift range and the shift range correction.
Figure 7:
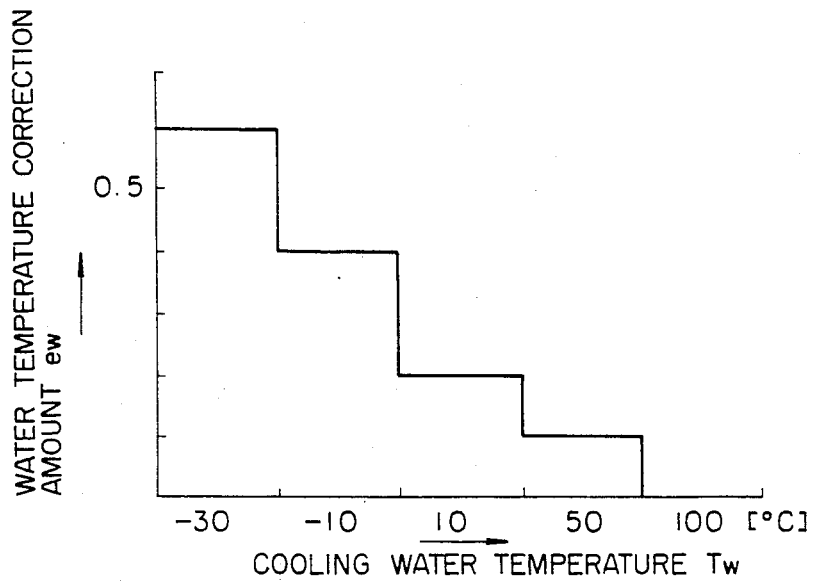
FIG. 7 is a graph showing the relationship between coolant temperature and the coolant temperature correction.

The basic speed ratio eb is set as a desired speed ratio e' in the drive range after completion of warming-up. The basic speed ratio eb other than data points in FIG. 5 is calculated by interpolation. In block 72 is calculated the correction amount es of shift range by shift range Ps. FIG. 6 shows the relationship between the shift range and the correction amount es of thereof. In L(low), 2(second) and D(drive) ranges, the es values are respectively 1.0, 0.5 and 0.0. In block 74 is calculated a water temperature correction amount ew on the basis of cooling water temperature Tw. FIG. 7 shows the relationship between the cooling water temperature Tw and the water temperature correction amount ew. As the cooling water temperature Tw is lowered, the water temperature correction amount ew is increased. In block 76 is calculated the actual speed ratio e of CVT 10. At point 78 is calculated a deviation (=eb−es−ew−e). A feedback gain is designated by block 80 and an amplifier for the flow controlling valve 38 by 82. As a result, the speed ratio of CVT 10 is controlled to be a desired speed ratio e'=eb−es−ew. The speed ratios in L range, second speed range and warming-up are corrected and reduced by es and ew corrections to prevent the driveability from degrading.

Figure 4:
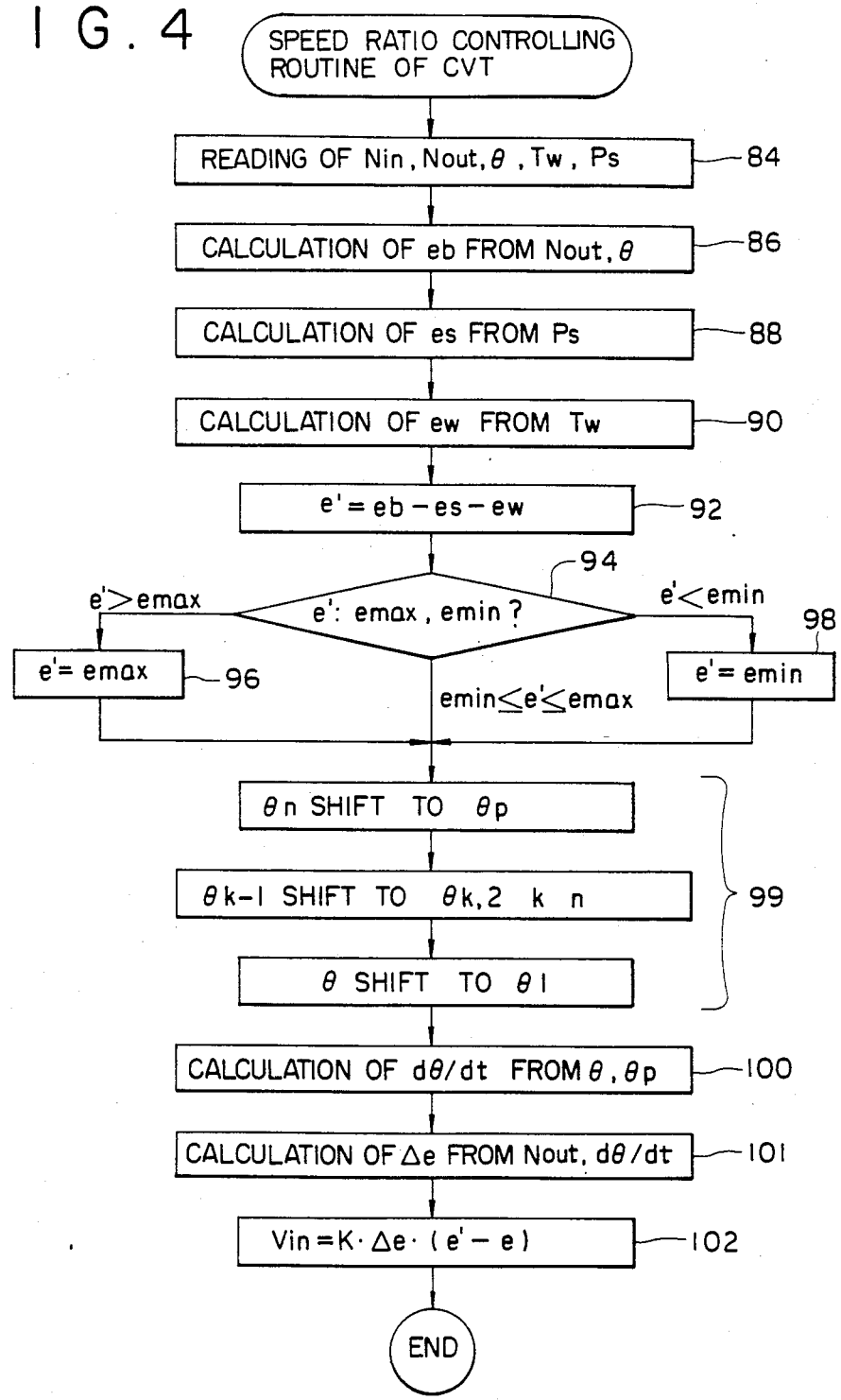
FIG. 4 is a flow chart showing an example of a control routine for the speed ratio of the CVT.

FIG. 4 is a flow chart of the speed ratio controlling routine of the CVT. A change amount $\Delta e$ per unit time to change the speed ratio e to the desired speed ratio e' is calculated, and when the actual speed ratio e is less than the desired speed ratio e' the oil flow transmitted via the flow controlling valve 38 to the input side hydraulic cylinder is increased by an amount corresponding to Δe. When the actual speed ratio e is larger than the desired speed ratio e′, the oil flow drained from the input side hydraulic cylinder through the flow controlling valve 38 is increased by an amount corresponding to Δe. Δe is used for the rate of speed change, and the greater is Δe, the greater is the absolute value of the rate of speed change. Since Δe is set as a function of the differential value dθ/dt of throttle position θ with respect to time and the rotational speed Nout of the output shaft, Δe specified to the minimum value for preventing acceleration problems in the running performance. As a result, an abrupt change in the speed ratio e causing the degradation of the specific fuel consumption can be restrained to improve the specific fuel consumption. Detailing the respective steps, in step 84 are read the rotational speed Nin of the input shaft 12, the rotational speed Nout of the output shaft 14, the throttle position θ, the engine cooling water temperature Tw and the shift range Ps. In step 86 is calculated the basic speed ratio eb from the rotational speed Nout of the output shaft and the throttle position θ.

The table in FIG. 5 shows the relationship between the rotational speed Nout of the output shaft, throttle position θ and the basic speed ratio eb. In FIG. 5, →, ← means that data values are respectively left or right data. The basic speed raio eb is set such that for the same throttle position, the more the rotational speed Nout of the output shaft is increased, the more the basic speed ratio eb is increased, and, for the same rotational speed of the output shaft, the more the throttle position θ is increased, the more the basic speed ratio eb is decreased in principle. Moreover, the basic speed ratio eb corresponding to any throttle position θ and the rotational speed Nout of the output shaft is obtained by utilizing interpolation. In step 88 is calculated the shift range correction amount es from the shift range Ps.

FIG. 6 shows the relationship between the shift range Ps and the shift range correction amount es. The shift range correction amount es is decreased in the order of L range, second range and D range. Thus, as is apparent from a formula in step 92 which will be described later, the desired speed ratio e′ is increased in the order of L range, second speed range and D range. In step 90 is calculated the water temperature correction amount ew from the engine cooling water temperature Tw.

FIG. 7 shows the relationship between the cooling water temperature Tw and the water temperature correction amount ew, and the water temperature correction amount ew is increased as the cooling water temperature Tw is lowered. Thus, as is understood from the formula in step 92, the desired speed ratio e′ is decreased as the engine cooling water temperature Tw is lowered. In step 92 is calculated the desired speed ratio e′ from the formula e′=eb−es−ew. In steps 94–98 are set the maximum and minimum desired speed ratio e′ to the upper limit emax and the lower limit emin respectively. In step 100 is calculated the differential value dθ/dt or throttle position θ with respect to time from the throttle position θ detected this time and the throttle position θp detected at the previous time. The sampling time of θp should be taken at a suitable value. The shorter sampling time causes a differential value fluctuation and the longer time causes a time delay of vehicle acceleration. The suitable value may be about 0.2–2.0 sec. In order to secure the sampling time, in step 99 the throttle position memory registers are shifted one after the other. In step 101 is calculated the change amount Δe in the speed ratio e from the rotational speed Nout of the output shaft and dθ/dt.

Figure 8:
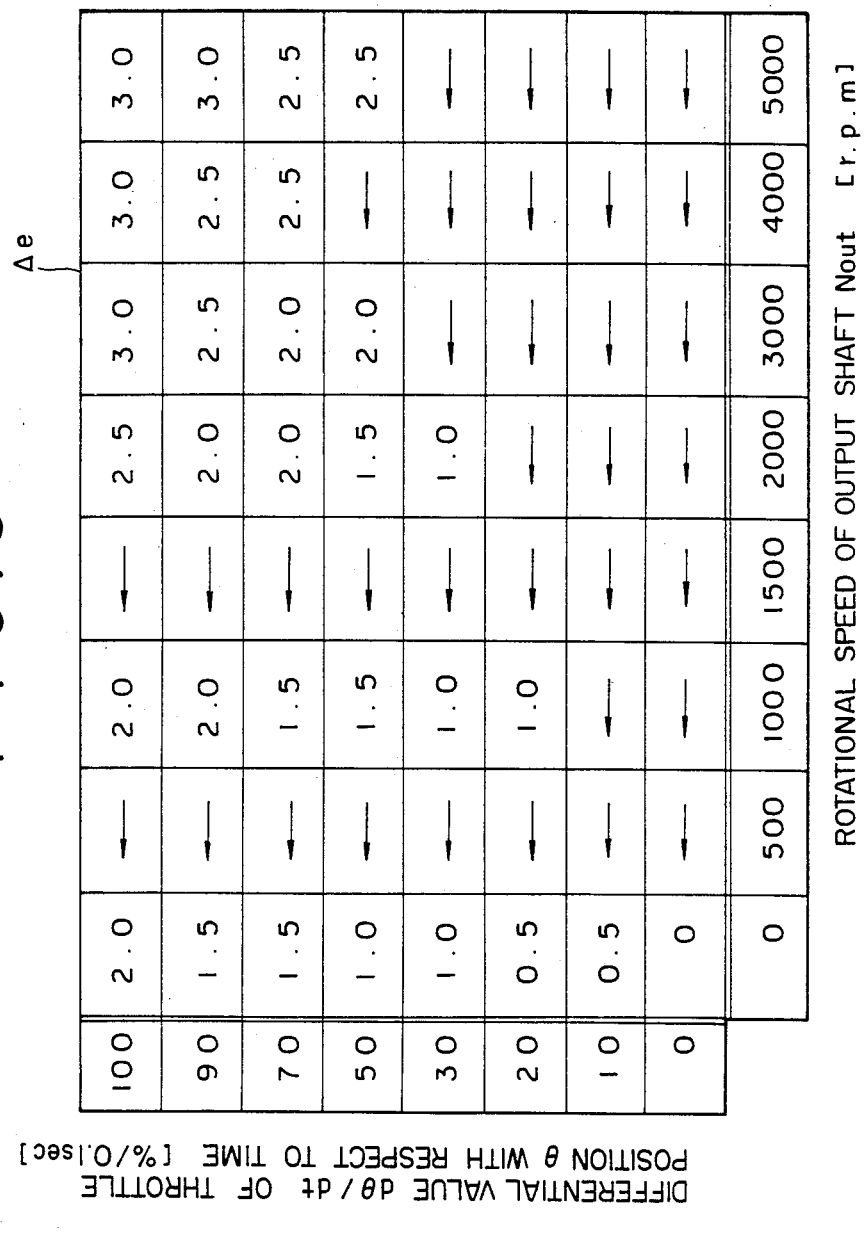
FIG. 8 is a chart illustrating the relationship between the output speed of the CVT and the differential of throttle position with respect to time.

FIG. 8 shows the relationship between the rotational speed Nout of the output shaft, dθ/dt and the change amount Δe. The change amount Δe in FIG. 8 is represented as the change in the speed ratio e per 1 second, and ← means that the data equal the left values. The change amount Δe is set to increase as the rotational speed Nout of the output shaft and the differential value dθ/dt of the throttle position θ with respect to time are increased. Further, in FIG. 8, dθ/dt is used for an alternative data of differential value dAc/dt of pedalling amount Ac of the accelerator pedal with respect to time, and instead of dθ/dt may be used Ac, dAc/dt or change amount ΔAc in Ac and further the intake pipe pressure P, throttle position θ, intake air flow Q, their change amounts ΔP, Δθ, ΔQ or their differential value dP/dt, dθ/dt with respect to time in corresponding relation to Ac. Also, instead of the rotational speed Nout of the output shaft, the corresponding vehicle speed V may be used. In step 102 is calculated control voltage Vin of the flow controlling valve 38 from the following formula;

$$Vin = K \cdot \Delta e \cdot (e' - e),$$

provided K is a constant. As a result, if e′−e>0, Vin>0, and the flow of hydraulic medium to the input side hydraulic cylinder is increased to increase the belt 26 engaging radii on the input side pulleys 22a, 22b. Also if e′−e>0, the oil flow drained from the input side hydraulic cylinder through the flow controlling valve 38 is increased to reduce the belt 26 engaging radii on the input side pulleys 22a, 22b.

Figure 9:
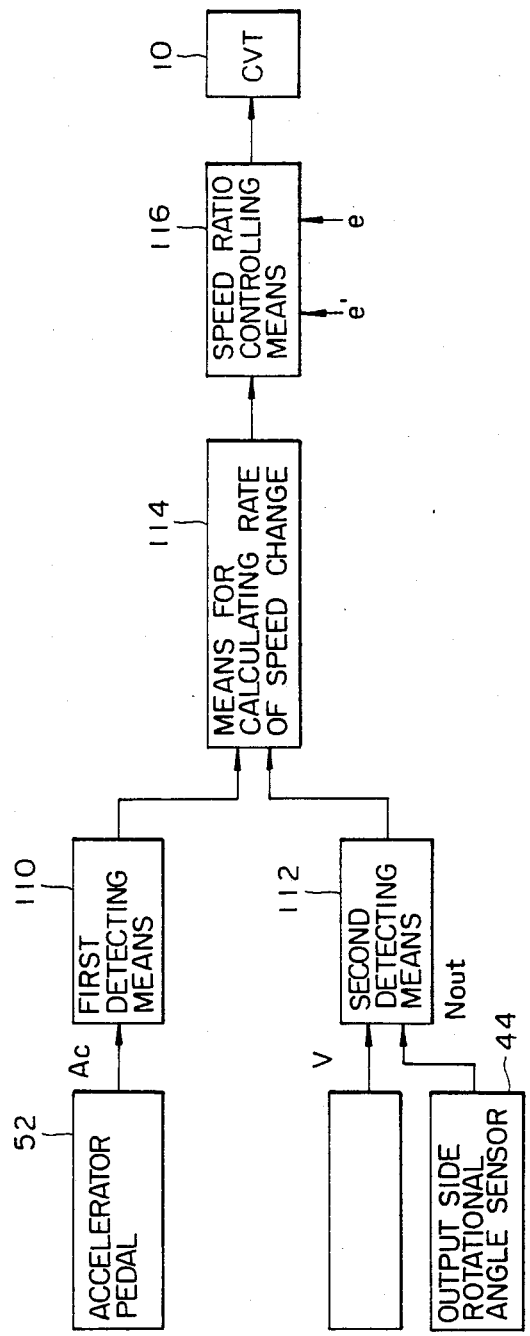
FIG. 9 is another block diagram illustrating features of the preferred embodiment of an apparatus of the present invention.

FIG. 9 is a block diagram of an apparatus according to the present invention. A first detecting means 110 detects the pedalling amount Ac of accelerator pedal 52, the change amount ΔAc in this Ac or the differential value ΔAc/dt of the ΔAc with respect to time. A second detecting means 112 detects the vehicle speed V or the rotational speed Nout of the output shaft of CVT 10. A means 114 for calculating the rate of speed change calculates the change amount Δe in the speed ratio e (since CVT 10 has the speed ratio e changed by Δe in a predetermined time cycle, Δe corresponds to the rate of speed change.) on the basis of the detected values of the detecting means 110, 112. A means 116 for controlling the speed ratio changes the speed ratio e by Δe in a predetermined time cycle when the actual speed ratio e differs from the desired speed ratio e′.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A control apparatus for a continuously variable transmission for vehicles, comprising:
   first detecting means for detecting a change amount (ΔAc) in a pedalling amount (Ac) of an accelerator pedal;
   second detecting means for detecting vehicle speed;
   calculating means for calculating a rate of change of speed ratio of the continuously variable transmission from outputs of the first and second detecting means such that said rate of change of speed ratio increases with an increase in said change amount; and control means for controlling the speed ratio of the continuously variable transmission in relation to the output of the calculating means.

2. A control apparatus of a continuously variable transmission for vehicles, comprising:
first detecting means for detecting a differential value (ΔAc/dt) of a pedalling amount (Ac) of an accelerator pedal with respect to time;
second detecting means for detecting vehicle speed;
calculating means for calculating a rate of change of speed ratio of the continuously variable transmission from outputs of the first and second detecting means such that said rate of change of speed ratio increases with an increase in said change amount; and
control means for controlling the speed ratio of the continuously variable transmission in relation to the output of the calculating means.

3. A control apparatus for a continuously variable transmission for vehicles, comprising:
first detecting means for detecting a change amount (ΔAc) in a pedalling amount (Ac) of an accelerator pedal;
second detecting means for detecting rotational speed of an output shaft of the continuously variable transmission;
calculating means for calculating a rate of change of speed ratio of the continuously variable transmission from outputs of the first and second detecting means such that said rate of change of speed ratio increases with an increase in said change amount; and
control means for controlling the speed ratio of the continuously variable transmission in relation to the output of the calculating means.

4. A control apparatus of a continuously variable transmission for vehicles, comprising:
first detecting means for detecting a differential value (ΔAc/dt) of a pedalling amount (Ac) of an accelerator pedal with respect to time;
second detecting means for detecting rotational speed of an output shaft of the continuously variable transmission;
calculating means for calculating a rate of change of speed ratio of the continuously variable transmission from outputs of the first and second detecting means such that said rate of change of speed ratio increases with an increase in said change amount; and
control means for controlling the speed ratio of the continuously variable transmission in relation to the output of the calculating means.

5. A method of controlling a continuously variable transmission for vehicles, comprising the steps of:
determining a differential value with respect to time of an intake pipe pressure of an engine of a vehicle;
determining a vehicle speed; and
changing the speed ratio of the continuously variable transmission such that the rate of change of said speed ratio is a function of said differential value and of said vehicle speed.

6. A method of controlling a continuously variable transmission for vehicles, comprising the steps of:
determining an amount of change in a pedalling amount of an accelerator pedal of a vehicle;
determining a rotational speed of an output shaft of the transmission; and
changing the speed ratio of the continuously variable transmission such that the rate of change of said speed ratio is a positive function of said amount of change in pedalling amount and of said rotational speed of the output shaft;
whereby a large change in the pedalling amount will produce a large change in the speed ratio rate of change.

7. A method of controlling a continuously variable transmission for vehicles, comprising the steps of:
determining a differential value with respect to time of a pedalling amount of an accelerator pedal of a vehicle;
determining a rotational speed of an output shaft of the transmission; and
changing the speed ratio of the continuously variable transmission such that the rate of change of said speed ratio is a positive function of said differential value and of said rotational speed of the output shaft;
whereby a large change in the pedalling amount will produce a large change in the speed ratio rate of change.

8. A method of controlling a continuously variable transmission for vehicles, comprising the steps of:
determining a differential value with respect to time of a throttle position of a throttle of an engine of a vehicle;
determining a vehicle speed; and
changing the speed ratio of the continuously variable transmission such that the rate of change of said speed ratio is a positive function of said differential value and of said vehicle speed;
whereby a large change in the pedalling amount will produce a large change in the speed ratio rate of change.

9. A method of controlling a continuously variable transmission for vehicles, comprising the steps of:
determining a differential value with respect to time of an intake air flow rate of an engine of a vehicle;
determining a vehicle speed; and
changing the speed ratio of the continuously variable transmission such that the rate of change of said speed ratio is a function of said differential value and of said vehicle speed.

10. An automatic transmission for automobiles, comprising:
a continuously variable transmission for transmitting the rotation of an angine of a vehicle to drive wheels of the vehicle;
means for detecting values of intake system throttle position of the engine and vehicle speed;
electronic memory means;
a data map prestored in said memory means containing basic speed ratios of said continuously variable transmission corresponding to predetermined intake system throttle positions and vehicle speeds, said basic speed ratios corresponding to desired speed ratios for a "drive" range of said transmission;
predetermined shift-position-related values prestored in said memory means for correcting said basic speed ratio to correspond to a "low" range and a "second" range of said transmission;
means for interrogating said memory means and for calculating a desired speed ratio as a substantially continuous function of intake system throttle position and vehicle speed on the basis of the detected values of intake system throttle position and vehicle speed by subtracting said predetermined shift-position-related values from the basic speed ratio as calculated based on the "drive" range when the transmission is set to the "low" range or the "second" range; and means for controlling the speed ratio of said continuously variable transmission to achieve the calculated desired speed ratio.

11. An automatic transmission for automobiles, comprising:
a continuously variable transmission for transmitting the rotation of an engine of a vehicle to drive wheels of the vehicle;
means for detecting values of intake system throttle position of the engine and vehicle speed;
electronic memory means;
a data map prestored in said memory means containing basic speed ratios of said continuously variable transmission corresponding to predetermined intake system throttle positions and vehicle speeds, said basic speed ratios corresponding to desired speed ratios for a "drive" range of said transmission;
a predetermined shift-position-related value prestored in said memory means for correcting said basic speed ratio to correspond to a "low" range of said transmission;
means for interrogating said memory means and for calculating a desired speed ratio as a substantially continuous function of intake system throttle position and vehicle speed on the basis of the detected values of intake system throttle position and vehicle speed by subtracting said predetermined shift-position-related value from the basic speed ratio as calculated based on the "drive" range when the transmission is set to the "low range; and
means for controlling the speed ratio of said continuously variable transmission to achieve the calculated desired speed ratio.

12. An automatic transmission for automobiles, comprising:
a continuously variable transmission for transmitting the rotation of an engine of a vehicle to drive wheels of the vehicle;
means for detecting values of intake system throttle position of the engine and vehicle speed;
electronic memory means;
a data map prestored in said memory means containing basic speed ratios of said continuously variable transmission corresponding to predetermined intake system throttle positions and vehicle speeds, said basic speed ratios corresponding to desired speed ratios for use when the temperature of the engine is above a predetermined temperature;
means for sensing the temperature of the engine and at least one predetermined temperature-related value prestored in said memory means as a function of temperature for correcting said basic speed ratio when the temperature of the engine is lower than said predetermined temperature;
means for interrogating said memory means and for calculating a desired speed ratio as a substantially continuous function of intake system throttle position and vehicle speed on the basis of the detected values of intake system throttle position and vehicle speed by subtracting a predetermined temperature-related value from the calculated desired speed ratio when the temperature of the engine is below said predetermined temperature; and
means for controlling the speed ratio of said continuously variable transmission to achieve the calculated desired speed ratio.

13. An automatic transmission for automobiles, comprising:
a continuously variable transmission for transmitting the rotation of an engine of a vehicle to drive wheels of the vehicle;
means for detecting values of intake system throttle position of the engine and vehicle speed;
electronic memory means;
a data map prestored in said memory means containing basic speed ratios of said continuously variable transmission corresponding to predetermined intake system throttle positions and vehicle speeds, said basic speed ratios corresponding to desired speed ratios for a "drive" range of said transmission;
a predetermined shift-position-related value prestored in said memory means for correcting said basic speed ratio to correspond to a "second" range of said transmission;
means for interrogating said memory means and for calculating a desired speed ratio as a substantially continuous function of intake system throttle position and vehicle speed on the basis of the detected values of intake system throttle position and vehicle speed by subtracting said predetermined shift-position-related value from the basic speed ratio as calculated based on the "drive" range when the transmission is set to the "second" range; and
means for controlling the speed ratio of said continuously variable transmission to achieve the calculated desired speed ratio.

14. An automatic transmission for automobiles as claimed in any of claims 11, 12 or 13,
said continuously variable transmission comprising input side disks, output side disks, and a belt trained over said input side disks and said output side disks,
said automoatic transmission comprising servo oil pressure means connected to said input side disks and output side disks for selectively changing radii at which said belt engages said input side disks and output side disks, said radii being variable in response to oil pressure established by said servo oil pressure means.

15. A method of controlling a continuously variable transmission for vehicles, comprising the steps of:
determining an amount of change in a pedalling amount of an accelerator pedal of a vehicle:
determining a vehicle speed; and
changing the speed ratio of the continuously variable transmission such that the rate of change of said speed ratio is a positive function of said amount of change in pedalling amount and of said vehicle speed;
whereby a large change in the pedalling amount will produce a large change in the speed ratio rate of change.

16. A method of controlling a continuously variable transmission for vehicles, comprising the steps of:
determining a differential value with respect to time of a pedalling amount of an accelerator pedal of a vehicle;

determining a vehicle speed; and changing the speed ratio of the continuously variable transmission such that the rate of change of said speed ratio is a positive function of said differential value and of said vehicle speed;

whereby a large change in the pedalling amount will produce a large change in the speed ratio rate of change.

17. A method of controlling a continuously variable transmission as claimed in either of claims 15 or 16, wherein an operating amount for changing the speed ratio of the continuously variable transmission up to a desired value corresponds to a change amount in the speed ratio of the continuously variable transmission per unit of time.

* * * * *